US006458232B1

(12) United States Patent
Valentinsson

(10) Patent No.: US 6,458,232 B1
(45) Date of Patent: Oct. 1, 2002

(54) PROCESS FOR THE MANUFACTURING OF THERMOPLASTIC PRODUCTS WITH HIGH CREEP STRAIN RESISTANCE

(75) Inventor: Anders Valentinsson, Färlöv (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

(21) Appl. No.: 09/380,314

(22) PCT Filed: Mar. 3, 1998

(86) PCT No.: PCT/SE98/00378

§ 371 (c)(1),
(2), (4) Date: Sep. 9, 1999

(87) PCT Pub. No.: WO98/40199

PCT Pub. Date: Sep. 17, 1998

(30) Foreign Application Priority Data

Mar. 10, 1997 (SE) .............................................. 9700859
Mar. 14, 1997 (SE) .............................................. 9700918

(51) Int. Cl.⁷ ......................... B65D 19/18; B65D 19/32; B29B 11/04
(52) U.S. Cl. ....................... 156/182; 156/196; 156/245; 156/292; 156/304.2; 156/308.2; 108/57.27
(58) Field of Search ......................... 156/308.2, 309.6, 156/309.9, 2.92, 73.5, 84, 196, 242, 245, 182, 304.2, 304.6, 322; 108/57.27, 901

(56) References Cited

U.S. PATENT DOCUMENTS 3,680,496 A * 8/1972 Westlake, Jr. ............ 108/57.27
3,923,948 A * 12/1975 Jackson et al. ............. 264/161
4,824,898 A   4/1989 Sukigara et al.
4,935,191 A * 6/1990 Baxi .......................... 264/572
5,108,529 A * 4/1992 Shuert ........................ 156/214
5,197,396 A * 3/1993 Breezer et al. ............ 108/56.3
5,391,251 A * 2/1995 Shuert ........................ 156/292
5,405,567 A * 4/1995 Needham et al. ........... 264/322
5,417,167 A * 5/1995 Sadr ........................... 108/901
5,555,820 A * 9/1996 Shuert ....................... 108/51.1
5,795,535 A * 8/1998 Giovannone et al. ....... 264/551
6,143,829 A * 11/2000 Babb et al. ................. 525/194

FOREIGN PATENT DOCUMENTS

| GB | 1293431 | 10/1972 |
| GB | 1400931 | 7/1975 |
| WO | 9318906 | 9/1993 |

* cited by examiner

Primary Examiner—Michael W. Ball
Assistant Examiner—Barbara J. Musser
(74) Attorney, Agent, or Firm—Stevens, Davis, Miller & Mosher, L.L.P.

(57) ABSTRACT

A process for the manufacturing of thermoplastic products with a high creep strain resistance. The products are free from reinforcing additives. The process includes at least vacuum forming and/or blow moulding of a thermoplastic material such as a polyolefine. A number of product parts are manufactured from a number of preferably tube- or sheet-shaped work pieces. The work pieces are heated so that the thermoplastic material softens whereby they are given the desired shape by means of a mould and the influence of vacuum and/or pressure. The product parts produced are allowed to cool and post-shrink and are hereafter joined to a unit.

21 Claims, 3 Drawing Sheets

PROCESS FOR THE MANUFACTURING OF THERMOPLASTIC PRODUCTS WITH HIGH CREEP STRAIN RESISTANCE

The present invention relates to a process for the manufacturing of products made of thermoplastic material, which products have a high creep strain resistance without the need for reinforcing additives.

Products made of thermoplastic materials can be manufactured by a number of different manufacturing procedures. The most commonly used methods are however, injection moulding, vacuum forming, blow moulding and press moulding.

In some fields of application a high load carrying capability is required. Carrying designs made of materials such as steel and concrete will be able to handle a load almost irrespective of factors like time and temperature. This is not the case with thermoplastic materials where relatively small loads can cause a remaining deformation when charged for a long period of time. This phenomenon is called creep strain, creep deformation or creepage. This creep strain is accelerated if the temperature is raised. A design made of thermoplastic material will however be able to withstand loads that are tens of times higher without remaining deformation when charged for shorter periods of time. The relation between the amount of creep strain, time and temperature is depending on type and quality of thermoplastic material.

Carrying thermoplastic designs most often have to be designed to withstand the highest temperature together with the longest period of time and the highest load that it could be exposed to during its useful life. The creep strain can however be decreased by adding filling or reinforcing additives to the thermoplastic material. Among filling additives that are commonly used can be mentioned minerals such as lime, glass beads and mica while reinforcing additives that are commonly used are fibres such as glass fibres, steel fibres or carbon fibres. It is also known to reinforce a thermoplastic product by integrating a metal design with the product. This can for example be constituted by a steel rod applied in a profile in the thermoplastic product. These additives and additions will however decrease some of the good qualities naturally occurring in the thermoplastic material. Among those qualities can be mentioned good impact strength, low weight and being a good electric, acoustic and heat insulator. It will also principally be impossible to recycle the material from a product containing additives. The ability to recycle thermoplastic materials is principally compulsory nowadays.

It has, quite surprisingly, according to the present invention, been made possible to manufacture creep stain resistant products of thermoplastic material, without the need of reinforcing additives. Accordingly, the invention relates to a process for the manufacturing of thermoplastic products with a high resistance against creep strain although the products are free from reinforcing additives. The process includes at least vacuum forming and/or blow moulding of a thermoplastic material such as polyethylene, polypropylene or polybutene. The invention is characterised in that a number of product parts are manufactured from a number of preferably tube or sheet shaped work pieces. The work pieces are heated so that the thermoplastic material softens, whereupon they are given the desired shape by means of a mould and the influence of vacuum and/or pressure. The product parts produced are allowed to cool and post-shrink. The product parts are hereafter assembled to a unit.

As is commonly known in the art of moulding plastics, post-shrinking is distinct from simply cooling. Specifically, a moulded part is considered to be post-shrunk when there is no longer a dimensional change of the moulded part conditioning for a specific period at a specific temperature.

According to one embodiment of the invention, at least one of the product parts is manufactured through injection moulding by means of a mould comprising one or more mould cavities. A molten thermoplastic material is injected into a mould cavity of the mould. The thermoplastic material is allowed to solidify. The mould can then be opened and product part be removed from the mould. The product part is then allowed to cool completely and post-shrink. The product parts is alternatively manufactured through injection moulding by means of a mould comprising one or more mould cavities. The mould includes means for injecting a pressurised gas. Molten thermoplastic material is injected into a mould cavity of the mould, whereupon the pressurised gas is injected into the molten thermoplastic material in the mould cavity. The thermoplastic material is allowed to solidify whereupon the gas is evacuated. The mould is then opened and the product part produced is removed from the mould. The product part is allowed to cool completely and post-shrink. It will hereby be possible to manufacture special features such as for example label pockets which are integrated with the article. Such special features are normally not possible to manufacture through vacuum forming or blow moulding.

According to one embodiment of the invention, one or more of the product parts are manufactured in a mould comprising a first and a second mould half. The mould halves include one shape-giving cavity each. The two shape-giving cavities together form a negative depiction of the outer shape of a product part. The mould halves are placed so that a space is formed between the two mould halves and so that the mould cavities are directed towards each other. Two pre-heated sheet shaped work pieces are applied between the two mould halves. The work pieces are individually forced towards the shape-giving surface of the mould cavities by means of vacuum and/or pressure. The mould halves are pressed together while the thermoplastic material is still hot so that the material in the work pieces confounds and a hollow unit is formed. It has shown to be a great advantage to connect the two surfaces on either side of the intermediate hollow space with each other by means of locally placed ridges or tower-like parts on product part containing large straight surfaces. This will increase the mechanical stability of the product as well as the ability to withstand bending when a load is applied.

The product parts preferably form parts such as a deck, a foot or a skid of a pallet, or a deck, a foot, a side wall or a skid of a pallet container or the like. According to one embodiment of the invention, the injection moulded product parts forms parts such as a foot or a skid to pallet, a foot, a side wall or a skid to a pallet container. These product parts are joined by welding such as butt welding, friction welding or filler welding. The surface of two product parts that are to be joined are heated until they melt when utilising the butt welding procedure. The heating is preferably achieved by bringing the surfaces to be joined in contact with a heated metal plate. The heated product parts are then pressed towards each other while the melted surfaces are allowed to cool.

When utilising friction welding, the surfaces that are to be joined are rubbed until they melt due to the friction heat. The most commonly used variants of this method is ultrasonic welding, low frequency welding and rotation welding.

Filler welding used on thermoplastic materials is similar to gas welding with filler bar used on metal. The surface of the joint and a filler bar made of the same thermoplastic material as in the product parts are heated with a hot air blower. The filler bar is used for filling the joint in a manner similar to that used for metal welding. The latter method can also be used in combination with the above mentioned methods.

The thermoplastic material used is preferably constituted by a polymer such as polyethylene, polypropylene or polybutene with an average molecular mass in the range 200,000–2,000,000 preferably above 300,000. In certain cases, such as for example when manufacturing products with thin walls, polymers with an average molecular mass in the range 1,000,000–2,000,000 could show advantageous, while products with heavy walls most often are manufactured of a polymer with an average molecular mass in the range 300,000–1,000,000.

According to one embodiment of the invention the tube or sheet shaped work pieces are constituted by a thermoplastic laminate with two or more layers. The layers are constituted by a combination of two or more of the materials selected from the group, virgin solid thermoplastic material, re-cycled solid thermoplastic material, virgin expanded thermoplastic material and re-cycled expanded thermoplastic material.

The invention is further illustrated together with enclosed figures showing different embodiments of the invention and a comparative example, whereby, FIG. 1 shows, in perspective, product parts of a pallet before the final assembly.

Figure 1:
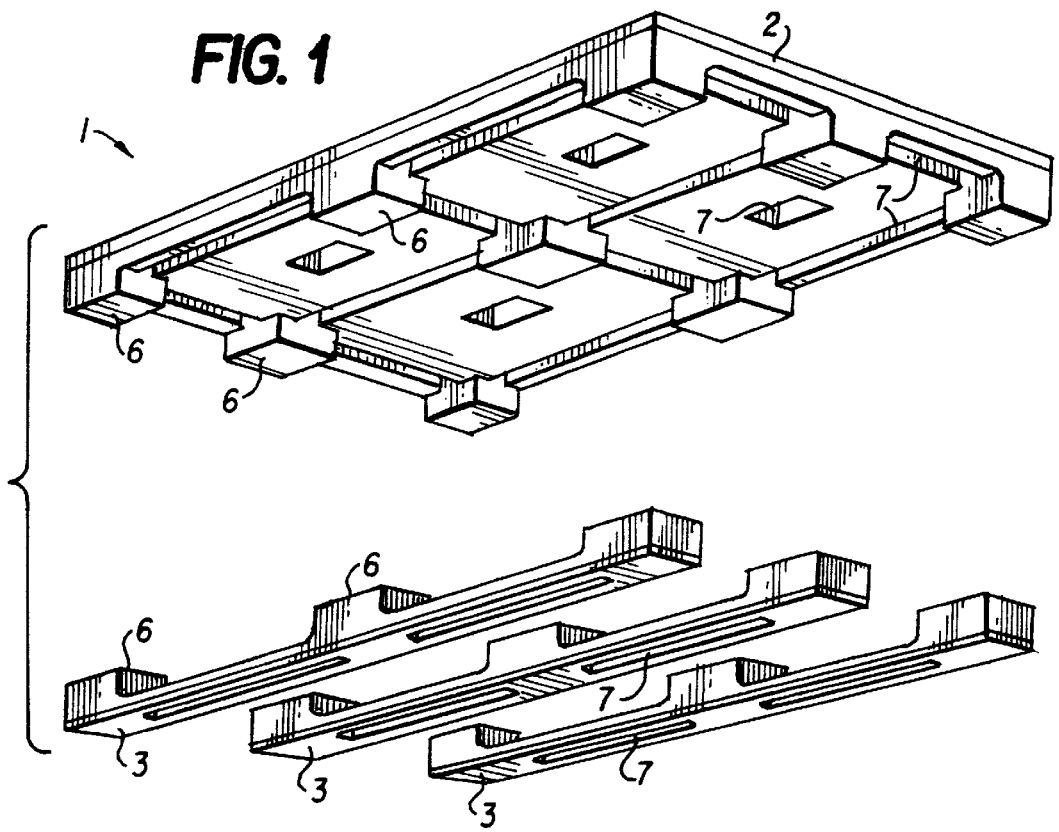

FIG. 1 shows, in perspective, product parts of a pallet 1 before the final assembly. The pallet 1 is manufactured by one embodiment of the process according to the invention. The pallet is made from product parts in the shape of a hollow pallet deck 2 and three similar hollow pallet skids 3. The pallet deck 2 and the pallet skids 3 are individually manufactured in one mould each. The moulds comprise a first and a second mould half which together include a shape-giving cavity which is a negative depiction of the pallet deck 2 and the pallet skids 3 respectively. The mould halves are placed so that an intermediate space is formed between the two halves and so that the cavities are directed towards each other. Two sheet-shaped, pre-heated work pieces of high-density polyethylene with an average molecular weight greater than 300,000 are then placed between the two mould halves. The two work pieces are then individually shaped towards the cavity of one mould half each by means of vacuum. The two mould halves are then pressed together while the thermoplastic material is still hot so that the material confound and form a hollow unit. The process is repeated for the different moulds so that a required amount of pallet decks 2 and pallet skids 3 are obtained. The pallet deck 2 and the pallet skids 3 are allowed to cool and post-shrink, which normally takes a day or two, before they are assembled to the final product. The pallet deck 2 and the pallet skids 3 are provided with a number of joining surfaces 6 intended for the joining of the pallet deck 2 and the pallet skids 3. The joining surfaces 6 are heated by being brought into contact with a hot metal plate. The parts 2 and 3 are the pressed together while the material in the joining surfaces 6 is still hot, whereby the parts 2 and 3 confounds so that they form a unit in the form of a pallet 1.

Figure 2:
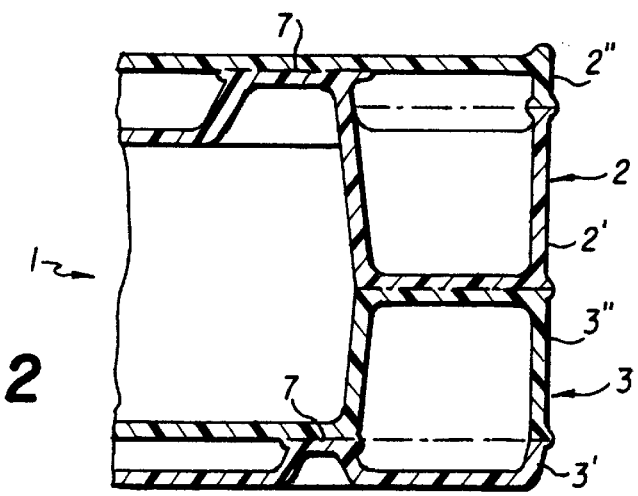
FIG. 2 shows, in cross-section, a part of a pallet manufactured through the process according to the invention.

FIG. 2 shows in cross-section a part of one embodiment of a pallet 1 obtained by the process according to the invention. A pallet skid 3 which is made from two sheet-shaped work pieces which constitute an upper half 3' and a lower half 3" of a pallet skid 3. The two pallet skid halves 3' and 3" were confounded in connection to the manufacturing as described in connection to FIG. 1.

The upper half and the lower half are, in addition to being joined along the edges, also joined by a number of local ridge- or tower-like protrusions 7 (see also FIG. 1) in larger parallel surfaces to increase the mechanical strength and the dimension stability. A pallet deck 2 is, in a similar way, made of an upper pallet deck half 2" and a lower pallet deck half 2' which halves are confounded in connection to the manufacturing. The two pallet deck halves 2' and 2" are, in addition to being joined along the edges, also joined by a number of local ridge- or tower-like protrusions 7 (see also FIG. 1) in larger parallel surfaces. The pallet skid 3 and the pallet deck 2 are hollow product parts that together form a pallet 1. The pallet skid 3 is joined with the pallet deck 2 by confounding as described in connection to FIG. 1.

Figure 3:
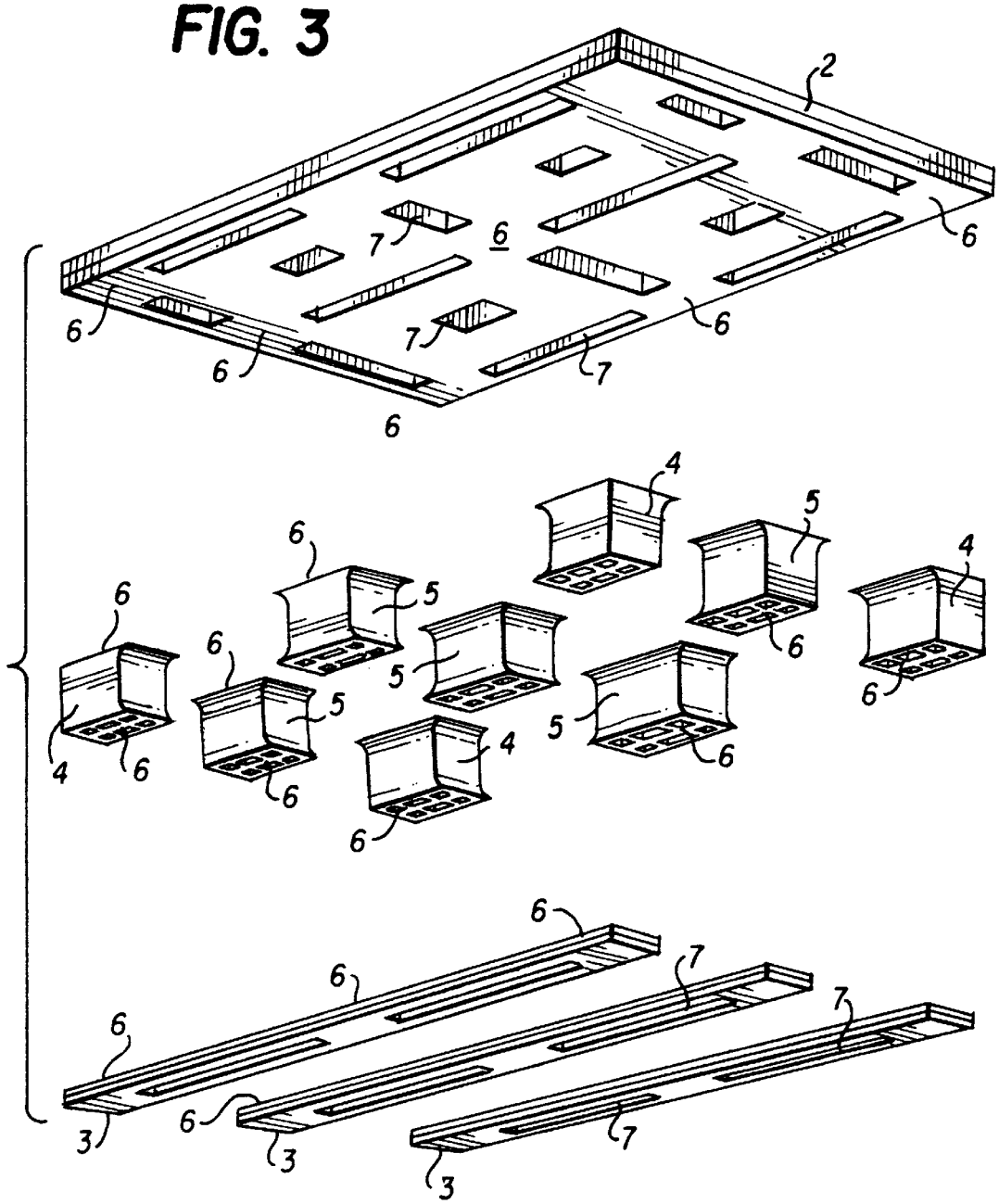
FIG. 3 shows, in perspective, product parts of a pallet before the final assembly. The pallet is manufactured by an alternative process according to the invention.

FIG. 3 shows, in perspective, parts of a pallet 1 before the final assembly. The pallet 1 is manufactured by an alternative embodiment according to the invention. The pallet 1 is constituted by a number of product parts in the form of a hollow pallet deck 2, three similar pallet skids 3, four corner feet 4 and five centre feet 5. The pallet deck 2 is given its shape in a mould comprising a first and a second mould half. Each half includes a shape-giving cavity. The two shape-giving cavities together form a negative depiction of the outer shape of the pallet deck 2. The mould cavities are placed so that an intermediate space is formed between the mould halves and that the two cavities are facing each other. Two pre-heated work pieces of high-density polyethylene with an average molecular weight greater than 300,000 are then placed between the two mould halves. The two work pieces are then individually shaped towards the cavity of one mould half each by means of vacuum. The two mould halves are then pressed together while the thermoplastic material is still hot so that the material confounds and forms a hollow unit. The parts obtained are allowed to cool so that the thermoplastic material becomes solid whereby the mould is opened and the part is removed. The process is repeated so that a required amount of pallet decks 2 is obtained. The pallet decks 2 are allowed to cool and post-shrink, which normally takes a day or two, before they are assembled with the other parts to the final product.

The pallet skid 3 is given its shape in a mould comprising a first and a second mould half. Each half includes a shape-giving cavity. The two shape-giving cavities together form a negative depiction of the outer shape of the pallet skid 3. The mould cavities are placed so that an intermediate space is formed between the mould halves and that the two cavities are facing each other. A pre-heated tube-shaped work piece of high-density polyethylene with an average molecular weight greater than 300,000 are then placed between the two mould halves, whereby the mould is closed. Air is blown into the tube-shaped work piece and the air in the space between the work piece and the mould is simultaneously ejected, whereby the work piece is forced towards the shape-giving surface of the mould.

As described above, post-shrinking is known in the art as a controlled conditioning, whereby the moulded part is brought to a specific temperature over a specific period of time. Accordingly, when the product parts of the invention are post-shrunk over a day or two, the temperature is brought, over the day or two, in a controlled manner down to ambient temperature.

The corner feet 4 and the centre feet 5 are manufactured by injection moulding in a mould including a number of mould cavities. The mould cavities form negative depictions of the corner feet 4 and the centre feet. An amount of molten thermoplastic material is injected into the mould cavities so that they are substantially filled. The thermoplastic material is then allowed to cool so that the thermoplastic material solidifies whereupon the mould is opened and the corner feet 4 and the centre feet 5 are removed from the mould. The procedure is repeated so that a desired amount of corner feet 4 and centre feet 5 are obtained. The feet parts 4 and 5 are allowed to cool and post-skrink, which normally takes a day or two, before they are assembled with other parts to the final products.

The pallet deck 2, the pallet skids 3, the corner feet 4 and the centre feet 5 are provided with a number of joining surfaces 6 which are heated by being brought into contact with a heated plate. One pallet deck 2, four corner feet 4, five centre feet 5 and three pallet skids 3 are then pressed together while the thermoplastic material in the joining surfaces is still hot whereby the different parts confounds so that a,unit in the form of a pallet 1 is obtained.

The product parts are, in addition to being joined along the edges, also joined by a number of local ridge- or tower-like protrusions 7 in larger parallel surfaces in order to increase the mechanical and dimensional stability.

Figure 4:
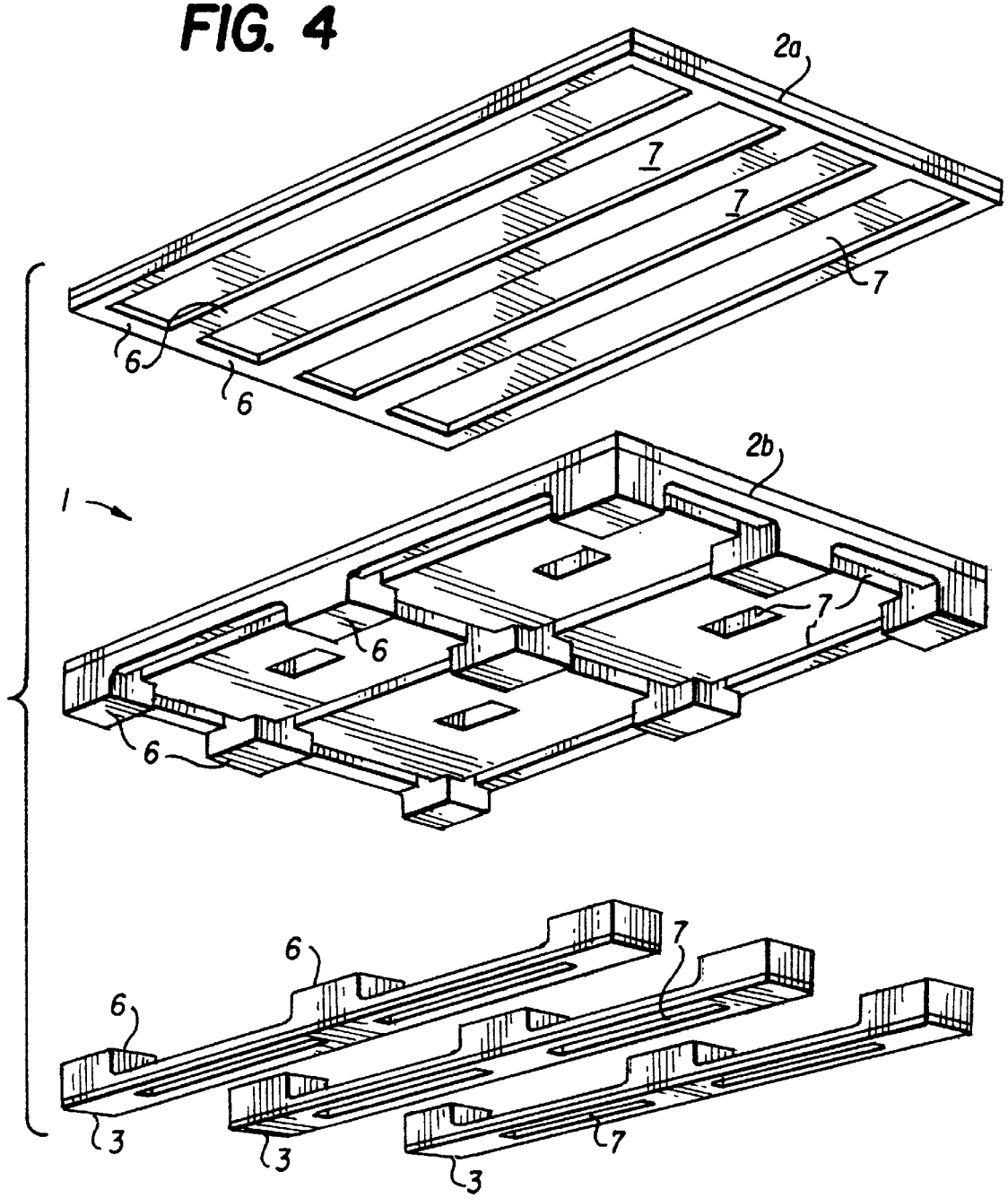
FIG. 4 shows, in perspective, product parts of a pallet before the final assembly.

FIG. 4 shows, in perspective, product parts of a pallet 1 before the final assembly. The pallet 1 is manufactured according to one embodiment of the process mainly corresponding to that described in connection to FIG. 1. The pallet 1 obtained through the process is intended for use in extreme conditions. The pallet is made from product parts in the shape of a upper hollow pallet deck 2a, a lower pallet deck 2b and three similar hollow pallet skids 3. The pallet decks 2a and 2b and the pallet skids 3 are individually manufactured in one mould each. The moulds comprise a first and a second mould half which together include a shape-giving cavity which is a negative depiction of the pallet decks 2a and 2b, and the pallet skids 3 respectively. The mould halves are placed so that an intermediate space is formed between the two halves and so that the cavities are directed towards each other. Two sheet-shaped, pre-heated work pieces of high-density polyethylene with an average molecular weight greater than 300,000 are then placed between the two mould halves. The two work pieces are then individually shaped towards the cavity of one mould half each by means of vacuum. The two mould halves are then pressed together while the thermoplastic material is still hot so that the material confounds and forms a hollow unit. The process is repeated for the different moulds so that a required amount of pallet decks 2a and 2b and pallet skids 3 are obtained. The pallet decks 2a and 2b, and the pallet skids 3 are allowed to cool and post-shrink, which normally takes a day or two, before they are assembled to the final product. The pallet decks 2a and 2b and the pallet skids 3 are provided with a number of joining surfaces 6 intended for the joining of the pallet decks 2a and 2b and the pallet skids 3. The joining surfaces 6 are heated by being brought into contact with a hot metal plate. The parts 2a, 2b and 3 are then pressed together while the material in the joining surfaces 6 is still hot, whereby the parts 2a, 2b and 3 confound so that they form a unit in the form of a pallet 1.

EXAMPLE

A pallet similar to the pallet shown in FIG. 1 and manufactured according to the process described in connection to FIG. 1 was placed on two beams so that the pallet was resting on 75 mm wide support surfaces on the two short sides. An ordinary pallet, manufactured through injection moulding was in the same way placed on two beams. The two pallets was manufactured, using the same amount of material, i.e. the two pallets have the same weight. The two pallets also have the sa,me outer dimensions. A point load of 10,000 N was applied for 48 h on each of the two pallets. The temperature was 21° C. during the test . The deflection, i.e. the downwards warping of the pallet was measured at a point half-way between the beams. The test was then repeated with two new pallets as above at a temperature of 40° C. All pallets were manufactured of high-density polyethylene without any additional reinforcing profiles such as beams of metal, neither was any reinforcing fibre or filler material added to the thermoplastic material. The result is shown in the table below.

TABLE 1

| Test temp. | Pallet according to the invention Deflection at the centre after 48 h | Ordinary pallet Deflection at the centre after 48 h |
| --- | --- | --- |
| 21° C. | 8 mm | 73 mm |
| 40° C. | 12 mm | 130 mm |

It is evident from the examples that a pallet manufactured according to the present invention will get a deformation considerably lower than the deformation on a pallet manufactured through injection moulding, although the same amount of material is used. A similar improvement will be obtained in other types of products, such as pallet containers and containers, made of thermoplastic material.

The invention is not limited by the embodiments shown since these can be varied in different ways within the scope of the invention.

What is claimed is:

1. A molding process for the manufacture of a product comprising at least a first product part and a second product part from a thermoplastic material selected from the group consisting of polyethylene, polypropylene and polybutylene which product has no reinforcing additives, in a mold having a first mold half and a second mold half, which together includes a shape-giving cavity being a negative depiction of the respective product part, the method comprising:

forming the first product part, comprising:
providing two mold halves, at least one of the mold halves having a projection in the shape-giving cavity thereby forming at least one protrusion in a work piece formed in said mold half;
placing the mold halves so that a space is formed between the two mold halves and so that the shape-giving cavity of each mold half is directed toward each other;
heating two work pieces which constitute an upper half and a lower half of the product part, thereby softening the thermoplastic material;
shaping the work pieces toward the cavity of each mold half with the assistance of vacuum, blowing, and combinations thereof, to form shaped work pieces;
moving the mold halves relatively toward one another and pressing the shaped work pieces together while the thermoplastic material is still hot to form a unitary hollow product part with the upper and lower halves of said product part being joined along their edges and by said at least one protrusion to increase mechanical strength and dimension stability; and cooling the first product part produced to the point where it can be removed from the mold though still at an elevated temperature; and further cooling the first product part for 1–2 days until the first product part has reached room temperature and post shrinking has been achieved;

forming the second product part, comprising:

injecting molten thermoplastic material into one or more mold cavities of the mold;

allowing the thermoplastic material to solidify;

opening the mold;

cooling the second product part produced to the point where it can be removed from the mold though still at an elevated temperature; and removing the product part from the mold;

further cooling the second product part for 1–2 days until the second product part has reached room temperature and post shrinking has been achieved; and joining the first product part to the second product part and receiving a high creep strain resistant product.

2. The process according to claim 1, further comprising molding at least one additional product part through injection molding by means of a mold comprising one or more mold cavities wherein the mold includes means for injecting a pressurized gas comprising:

injecting molten thermoplastic material into a mold cavity of the mold; and injecting pressurized gas into the molten thermoplastic material in the mold cavity;

allowing the thermoplastic material to solidify;

evacuating the gas;

opening the mold;

removing the product part from the mold;

allowing the product part to cool completely and post-shrink; and joining the post-shrunk at least one additional product part to the product.

3. The process according to claim 1, wherein the thermoplastic material is constituted by a polymer with an average molecular mass in the range 200,000–2,000,000.

4. The process according to claim 3, wherein the average molecular mass of the thermoplastic material is greater than 300,000.

5. The process according to claim 1, wherein the thermoplastic material is constituted by a thermoplastic laminate with at least two layers, wherein the layers are constituted by a combination of at least two of the materials selected from the group consisting of virgin solid thermoplastic material, recycled solid thermoplastic material, virgin expanded thermoplastic material and recycled expanded thermoplastic material.

6. The process according to claim 1, wherein said at least one protrusion joining the upper and lower halves of said first product part has a shape selected from the group consisting of a tower or ridge.

7. The process according to claim 1, wherein each work piece is in a form consisting of a sheet.

8. The process according to claim 1, wherein the two work pieces are provided in the form of a two separate sheets prior to said heating.

9. The process according to claim 1, further comprising molding work pieces into at least one product part selected from the group consisting of a pallet deck, a foot and a skid of a pallet; and a pallet deck, a foot, a side wall and a skid of a pallet container.

10. The process according to claim 1, further comprising molding one or both work pieces into at least one shape selected from the group consisting of a pallet deck, a foot and a skid of a pallet; and a pallet deck, a foot, a side wall and a skid of a pallet container.

11. The process according to claim 1, wherein the two work pieces are part of a single tube, having a circumferential surface, wherein said circumferential surface serves as both the first and the second work piece.

12. The method of claim 1, wherein the first product part is a first hollow pallet deck and the second product part is at least one hollow pallet skid.

13. The method of claim 12, further comprising molding a second hollow deck member and wherein the product comprises three second product parts, wherein each of the second product parts a hollow pallet skid.

14. The method according to claim 1, wherein said joining of the first product part to the second product part is by welding.

15. The process according to claim 14, wherein said welding of the hollow pallet deck and the hollow pallet skids includes welding selected from the group consisting of butt welding, friction welding and filler welding.

16. The process according to claim 14, wherein said welding of the hollow pallet deck and the hollow pallet skids includes welding selected from the group consisting of butt welding, friction welding and filler welding.

17. The process according to claim 14, wherein said welding is selected from the group consisting of ultrasonic welding, low frequency welding and rotation welding.

18. A molding process for the manufacture of a product comprising a hollow pallet deck and a at least one hollow pallet skid from a thermoplastic material selected from the group consisting of polyethylene, polypropylene and polybutylene, which product has no reinforcing additives, in a mold having a first mold half and a second mold half, which together includes a shape-giving cavity being a negative depiction of the respective product part, the method comprising:

forming one of either the pallet deck or the at least one skid, comprising:

providing two mold halves, at least one of the mold halves having a projection in the shape-giving cavity thereby forming at least one protrusion in a work piece formed in said mold half;

placing the mold halves so that a space is formed between the two mold halves and so that the shape-giving cavity of each mold half is directed toward each other;

heating two work pieces which constitute an upper half and a lower half of the product part, thereby softening the thermoplastic material;

shaping the work pieces toward the cavity of each mold half with the assistance of vacuum, blowing, and combinations thereof, to form shaped work pieces;

moving the mold halves relatively toward one another and pressing the shaped work pieces together while the thermoplastic material is still hot to form a unitary hollow product part with the upper and lower halves of said product part being joined along their edges and by said at least one protrusion to increase mechanical strength and dimension stability; and cooling the first product part produced to the point where it can be removed from the mold though still at an elevated temperature; and further cooling the first product part for 1–2 days until the first product part has reached room temperature and post shrinking has been achieved;

forming the other of the pallet deck or at least one skid, having a high creep strain resistance, no reinforcing additives, a mold, the mold having a first mold half and a second mold half, which together includes a shape-giving cavity being a negative depiction of the respective product part, the method comprising:

- providing two mold halves, at least one of the mold halves having a projection in the shape-giving cavity thereby forming at least one protrusion in a work piece formed in said mold half;
- placing the mold halves so that a space is formed between the two mold halves and so that the shape-giving cavity of each mold half is directed toward each other;
- heating two work pieces which constitute an upper half and a lower half of the product part, thereby softening the thermoplastic material;
- shaping the work pieces toward the cavity of each mold half with the assistance of vacuum, blowing, and combinations thereof, to form shaped work pieces;
- moving the mold halves relatively toward one another and pressing the shaped work pieces together while the thermoplastic material is still hot to form a unitary hollow product part with the upper and lower halves of said product part being joined along their edges and by said at least one protrusion to increase mechanical strength and dimension stability; and
- cooling the second product part produced to the point where it can be removed from the mold though still at an elevated temperature; and
- further cooling the second product part for 1–2 days until the second product part has reached room temperature and post shrinking has been achieved; and joining the hollow pallet deck and hollow pallet skids together.

19. The method of claim 18, comprising forming two hollow pallet decks and three hollow pallet skids.

20. The process according to claim 18, wherein said joining of the pallet deck and skid is by welding.

21. The process according to claim 20, wherein said welding is selected from the group consisting of ultrasonic welding, low frequency welding and rotation welding.

* * * * *